United States Patent
Brunnegard et al.

(10) Patent No.: US 12,055,649 B2
(45) Date of Patent: Aug. 6, 2024

(54) VEHICLE POSITIONING BASED ON WIRELESS SIGNAL TRANSMISSION

(71) Applicant: ARRIVER SOFTWARE AB, Linköping (SE)

(72) Inventors: Oliver Brunnegard, Vargarda (SE); Olof Eriksson, Alvsjo (SE); Meifang Zhu, Lund (SE); Junshi Chen, Lund (SE)

(73) Assignee: Arriver Software AB, Linköping (SE)

( * ) Notice: Subject to any disclaimer, the term of this patent is extended or adjusted under 35 U.S.C. 154(b) by 420 days.

(21) Appl. No.: 17/293,207

(22) PCT Filed: Nov. 12, 2019

(86) PCT No.: PCT/EP2019/081007
§ 371 (c)(1),
(2) Date: May 12, 2021

(87) PCT Pub. No.: WO2020/104250
PCT Pub. Date: May 28, 2020

(65) Prior Publication Data
US 2022/0003832 A1   Jan. 6, 2022

(30) Foreign Application Priority Data

Nov. 22, 2018  (EP) ..................... 18207727

(51) Int. Cl.
*G01S 5/02*     (2010.01)
(52) U.S. Cl.
CPC .................. *G01S 5/0273* (2013.01)
(58) Field of Classification Search
CPC .............. G01S 5/0273; G01S 19/428
(Continued)

(56) References Cited

U.S. PATENT DOCUMENTS

| 5,974,329 | A | 10/1999 | Wylie et al. |
| 10,656,286 | B2 | 5/2020 | Eriksson et al. |
| 2017/0123046 | A1* | 5/2017 | Ramlall ................... G01S 5/06 |
| 2018/0183650 | A1* | 6/2018 | Zhang ................... H04W 72/21 |
| 2020/0003861 | A1 | 1/2020 | Eriksson et al. |
| 2020/0003907 | A1 | 1/2020 | Eriksson et al. |

(Continued)

FOREIGN PATENT DOCUMENTS

| EP | 3376249 A1 | 9/2018 |
| WO | 2018222124 A1 | 12/2018 |

OTHER PUBLICATIONS

M. Ulmschneider, R. Raulefs, C. Gentner and M. Walter, "Multipath assisted positioning in vehicular applications," 2016 13th Workshop on Positioning, Navigation and Communications (WPNC), Bremen, Germany, 2016, pp. 1-6, doi: 10.1109/WPNC.2016.7822850. (Year: 2016).*

(Continued)

*Primary Examiner* — Bo Fan
(74) *Attorney, Agent, or Firm* — Arriver Software AB (57) ABSTRACT

A method for estimating a position of a vehicle (100) relative to one or more radio transceivers (150). The method including the steps of; obtaining propagation delay data associated with radio transmission between a vehicle transceiver (110) included in the vehicle (100) and the one or more radio transceivers (150); obtaining vehicle motion data related to a trajectory of the vehicle (100); identifying one or more multipath components, MPC, in the propagation delay data, the MPC relates to a radio transmission propagation path between a fixed radio transceiver (150) and the vehicle transceiver (110); determining an MPC track for each identified MPC based on the vehicle motion data and on the propagation delay data, MPC track representing evolution of an MPC over time; and estimating the position of the vehicle (100) relative to the one or more radio transceivers (150) based on the MPC tracks.

15 Claims, 6 Drawing Sheets

(58) Field of Classification Search
USPC .......................... 342/457, 357.21, 453, 460
See application file for complete search history.

(56) References Cited

U.S. PATENT DOCUMENTS

| | | |
|---|---|---|
| 2020/0011960 A1 | 1/2020 | Eriksson et al. |
| 2020/0013281 A1 | 1/2020 | Eriksson et al. |
| 2020/0019176 A1 | 1/2020 | Eriksson et al. |
| 2020/0166601 A1 | 5/2020 | Chen et al. |

OTHER PUBLICATIONS

M. Ulmschneider and C. Gentner, "Multipath assisted positioning for pedestrians using LTE signals," 2016 IEEE/ION Position, Location and Navigation Symposium (PLANS), Savannah, GA, USA, 2016, pp. 386-392, doi: 10.1109/PLANS.2016.7479725. (Year: 2016).*
C. Gentner, T. Jost, W. Wang, S. Zhang, A. Dammann and U. -C. Fiebig, "Multipath Assisted Positioning with Simultaneous Localization and Mapping," in IEEE Transactions on Wireless Communications, vol. 15, No. 9, pp. 6104-6117, Sep. 2016, doi: 10.1109/TWC.2016.2578336. (Year: 2016).*
European Search Report—18207727—Search Authority—Munich—Jun. 5, 2019.
Ulmschneider, Markus, et al., "Multipath Assisted Positioning in Vehicular Applications", 2016 13th Workshop on Positioning, Navigation and Communications (WPNC), IEEE, Oct. 19, 2016 (Oct. 19, 2016), pp. 1-6, XP033046095, DOI: 10.1109/WPNC.2016.7822850.
International Search Report and Written Opinion of PCT/EP2019/081007, filed Nov. 12, 2019.

* cited by examiner

VEHICLE POSITIONING BASED ON WIRELESS SIGNAL TRANSMISSION

CROSS-REFERENCE TO RELATED APPLICATIONS

This application is a 35 U.S.C. § 371 national phase of PCT International Application No. PCT/EP2019/081007, filed Nov. 12, 2019, which claims the benefit of priority under 35 U.S.C. § 119 to European Patent Application No. 18207727.1, filed Nov. 22, 2018, the contents of which are incorporated herein by reference in their entirety.

FIELD OF THE INVENTION

The present disclosure relates to methods and devices for positioning a vehicle based on radio transmissions between a transceiver arranged in the vehicle and one or more other radio transceivers. The technique relies on multipath propagation involving radio signal reflections in order to increase positioning accuracy and robustness.

BACKGROUND

Positioning systems based on radio frequency signal transmissions have been known for some time. One example is the Global Positioning System (GPS), which uses radio transmissions between satellites in fixed orbit and a mobile transceiver to position the mobile transceiver.

Satellite-based positioning systems provide positioning services around the globe. However, both accuracy and reliability are hampered in environments without a clear view of the sky, such as in dense urban environments and in indoor environments.

Positioning systems using fixed land-based radio transceivers are also known. Early examples include the Decca navigator system and the LORAN navigation system.

EP 3376249 A1 describes a positioning method based on multi-dimensional scaling (MDS) which is based on fixed or moving land-based transceivers.

An important parameter which influences the obtainable positioning accuracy is the number of radio signals that can be used for positioning. Often, more radio transceivers in reach of the mobile transceiver results in higher positioning accuracy.

The geometry of the positioning scenario also influences positioning accuracy. Scenarios where a majority of radio signals are received or transmitted in a similar direction often has inferior accuracy compared to scenarios where reference signals are received or transmitted in different directions.

Multipath propagation refers to the occurrence of refraction and reflection as radio transmissions are propagating from transmitter to receiver. A transceiver receiving a transmission in the presence of multipath propagation will receive a plurality of copies of the transmitted signal at different delays and amplitudes. A line-of-sight (LOS) signal component, if present, arrives first followed by the one or more reflected signal components.

Recently, multipath propagation has been used for positioning purposes. Each multipath propagation component (MPC), can be seen as a separate signal originating from a virtual transmitter. This way, the geometry of the positioning problem can be improved, and the number of available transmitted signals increased.

In "Simultaneous Localization and Mapping in Multipath Environments: Mapping and Reusing of Virtual Transmitters", Proceedings of the 29th International Technical Meeting of The Satellite Division of the Institute of Navigation, Sep. 12-16, 2016, Gentner, Ma, Pöhlmann, Ulmschneider, Jost, and Dammann describe a system for positioning in indoor environments based on multipath propagation. Here, MPCs are treated as LOS components originated from virtual transmitters (VT). The VTs are then positioned jointly with the mobile transceiver.

The signals from cellular radio base stations (RBS), like third-generation partnership project (3GPP) long term evolution (LTE) compliant RBSs, may be used to calculate the position of a radio transceiver arranged in a vehicle. However, to create an accurate vehicle trajectory over time, the signals from both real and virtual transmitters need to be identified and tracked over time. This poses a severe problem in, e.g., urban environments, due to changing radio paths as the vehicle moves.

It is an object of the present disclosure to provide further enhancements in vehicle positioning based on radio signal transmission in multipath propagation scenarios.

SUMMARY AND INTRODUCTORY DESCRIPTION OF THE INVENTION

The above-described object is achieved by a method for estimating a position of a vehicle relative to one or more fixed or mobile radio transceivers. The method includes obtaining vehicle motion data related to a trajectory T of the vehicle and obtaining propagation delay data associated with radio transmission between a vehicle transceiver in the vehicle and the one or more radio transceivers. The method also includes identifying one or more multipath components (MPC) in the propagation delay data, where each MPC relates to a radio transmission propagation path between a radio transceiver and the vehicle transceiver and where at least one MPC relates to an indirect radio transmission propagation path between a fixed radio transceiver and the vehicle transceiver. The method includes determining an MPC track for each identified MPC based on the vehicle motion data and on the propagation delay data. An MPC track represents an evolution of the respective MPC over time. The method furthermore includes estimating the position of the vehicle relative to the one or more radio transceivers based on the MPC tracks.

By using both vehicle motion data and propagation delay data the position estimation is improved in terms of robustness and accuracy. This is at least in part due to that the vehicle motion data can be used to resolve ambiguities present in the position estimation problem.

Also, by including both direct and indirect propagation paths in the position estimation problem, more data becomes available to estimate the position of the vehicle. This additional data potentially improves accuracy of the final vehicle position estimate.

According to aspects of embodiments of the present invention, at least one of the radio transceivers is a radio base station (RBS) in a wireless access network or is arranged on a satellite in fixed orbit. Consequently, the disclosed methods are applicable for positioning using existing infrastructure, which is an advantage since no new positioning infrastructure is necessary.

According to other aspects of embodiments of the present invention, the vehicle motion data includes any of velocity data, acceleration data, vehicle heading data, and vehicle type data, such as, e.g., car, truck, motorcycle. It is an advantage that the disclosed methods are applicable to a wide variety of vehicle motion data types, since this enables the obtaining of larger data sets to improve position estimation performance.

According to further aspects of embodiments of the present invention, the identifying step includes detecting propagation paths, grouping detected paths based on respective propagation path delay, and identifying each group of propagation paths as a single MPC having a respective MPC delay value. This method of identifying MPCs reduces complexity since groups of MPC are replaced by single MPCs. The complexity reduction allows for a more cost-efficient implementation with reduced requirements on, e.g., processing capability and delay constraints.

According to aspects of embodiments of the present invention, the determining an MPC track step includes filtering propagation delay data based on vehicle motion data. The filtering reduces noise in the obtained measurement data, which often leads to improved position estimation performance.

According to aspects of embodiments of the present invention, the determining an MPC track step includes interpolating between MPC track sections when an MPC track is temporarily undeterminable in-between two MPC track sections. This 'stitching' of MPC track sections reduces impact of intermittently available MPCs, i.e., MPCs which come and go, which is an advantage. The interpolating step may optionally make use of the vehicle data to associate corresponding MPC track sections to be stitched together.

According to aspects of embodiments of the present invention, the determining an MPC track step includes fitting the MPC track data to a polynomial model adapted to dynamics of the vehicle. This way the dynamics of a certain vehicle can be considered for improving the position estimation result. Some vehicles are expected to behave differently from other vehicles. For instance, a large truck is often associated with a reduced acceleration performance compared to a smaller motorcycle or car. This information can be used to refine the position estimate, by fitting the MPC track data to a model which account for vehicle behavior. The obtained vehicle motion data step can optionally be used here to refine the polynomial model, or to refine parameters used in parameterizing the polynomial model.

According to aspects of embodiments of the present invention, the estimating step includes inputting the determined MPC tracks to a simultaneous location and mapping (SLAM) algorithm configured to estimate the position of the vehicle relative to the one or more radio transceivers. SLAM-based algorithms offer efficient and accurate position estimation, which is an advantage.

According to aspects of embodiments of the present invention, the method may further include uploading obtained determined, or estimated data to a remote server. By uploading data to a server, the data can be made available to other vehicles wanting to estimate their position. This is an advantage since it results in improved collective positioning performance for a group of vehicles operating in the same radio environment.

According to aspects of embodiments of the present invention, the method includes the step of downloading any of propagation delay data, MPC data, an estimated position of a virtual transceiver and/or an estimated position of a fixed radio transceiver from a remote server. The feature of downloading data from the server allows for a group of vehicles to collaborate in order to improve their own and also each other's positioning performance. This is an advantage since it allows for a group of vehicles to collectively improve accuracy and robustness of the vehicle position estimates.

According to aspects of embodiments of the present invention, the method includes the step of requesting a carrier aggregation service from at least one of the one or more radio transceivers and obtaining at least part of the propagation delay data based on radio transmission using aggregated wireless carriers. Larger bandwidth often results in improved distance estimation performance, which is an advantage. Thus, by requesting carrier aggregation, a larger total bandwidth signal can be used for the obtaining of propagation delay data, which then can be expected to have a higher distance resolution.

There is also disclosed herein a control unit for a vehicle having functions corresponding to the disclosed methods. The control unit is therefore associated with the same advantages as the methods disclosed herein.

There are also disclosed herein vehicles and groups of vehicles, such as vehicles arranged in platoons, including the control units arranged for estimating vehicle position relative to the one or more fixed or mobile radio transceivers.

BRIEF DESCRIPTION OF THE DRAWINGS

The present disclosure will now be described in detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
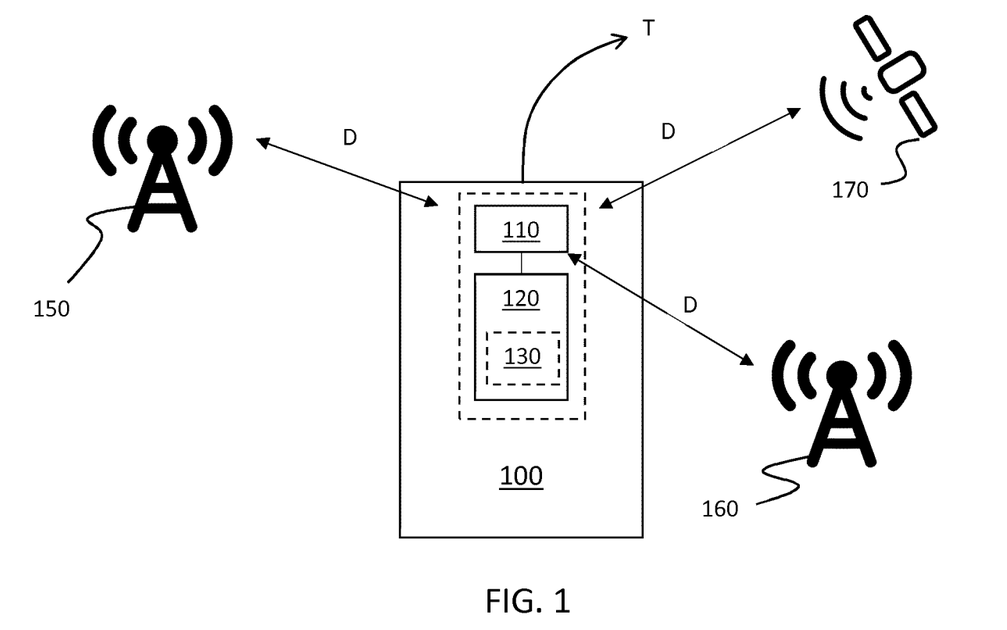
FIGS. 1-3 show schematic views of a vehicle with a radio transceiver in a positioning scenario.

FIG. 1 shows a vehicle 100 moving along a trajectory T. The vehicle is equipped with a radio frequency transceiver 110 connected to a control unit 120 arranged to process data obtained from the transceiver 110. The control unit 120 optionally includes a storage module 130 for storing data and instructions. The control unit 120 will be discussed in more detail below in connection to FIGS. 9 and 11.

It is desired to position the vehicle 100 in an absolute coordinate system, such as the World Geodetic System (WGS) 84, or in a relative coordinate system based on the vehicle location and heading, or in a relative coordinate system based on a location of one or more external radio transceivers. Once a position estimate in one reference system is available it I often straight forward to transform the estimate into another reference system by a linear transform. It is thus appreciated that the herein disclosed positioning methods are applicable to a wide variety of positioning reference systems.

It is possible to estimate a position of the vehicle 100 based on propagation delay measurements between the vehicle 100 and one or more external radio transceivers 150, 160, 170. The external radio transceivers can be fixed radio transceivers 150, 160 such as radio base stations (RBS) in a cellular communication system based on, e.g., the Long-Term Evolution (LTE) defined by the third-generation partnership project (3GPP), or Wi-Fi access points, or application specific radio location beacons, or the like. The external radio transceivers can also be radio transceivers arranged on satellites 170, such as satellites included in the GPS or Glonass positioning systems.

Several techniques and methods for estimating a position in two or three dimensions based on delay measurements are known and will not be discussed in more detail here.

Several techniques for tracking a position in two or three dimensions over time are also known and will not be discussed in more detail here.

The accuracy of the position estimate, and the obtainable robustness, i.e., how often a position estimate with adequate accuracy can be obtained, is at least partly determined by the number of available distance measurements. For instance, a larger number of independent distance measurements often imply an increased positioning accuracy.

Also, it is often beneficial to obtain distance estimates to transceivers in different directions, rather than obtaining distance estimates to transceivers located in the same or similar direction from the vehicle. The positioning scenario illustrated in FIG. 1 is therefore rather good, since the distance estimates on direct propagation paths D extend in different directions form the vehicle an not in the same direction. A positioning scenario such as that in FIG. 1, but with the external transceiver 150 removed, is worse since there is a reduced number of distance estimates available with a less diverse geometry.

Figure 2:
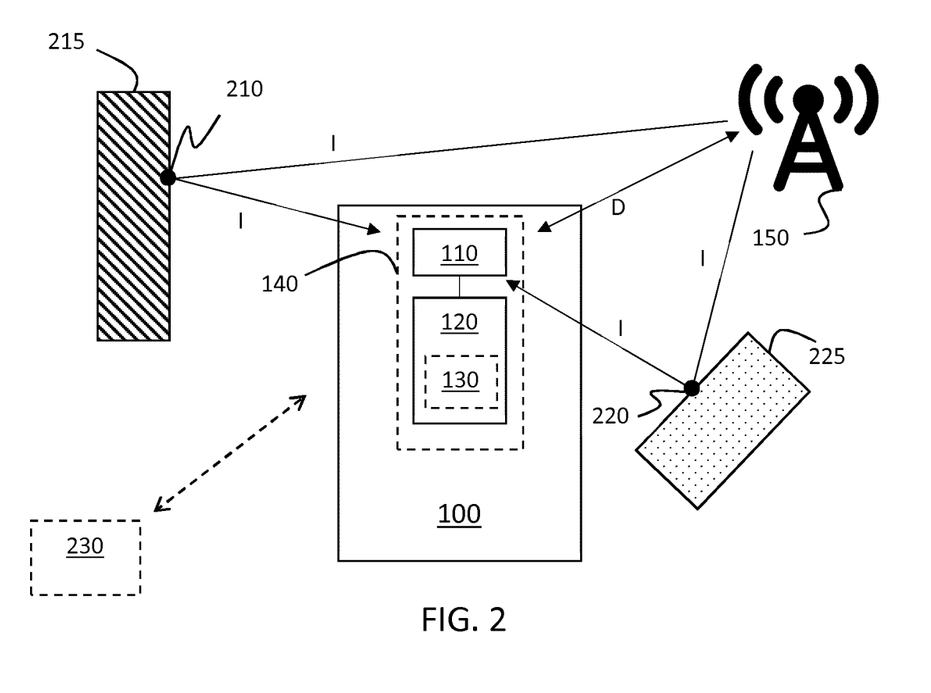

FIG. 2 illustrates another positioning scenario where only a single external radio transceiver 150 is available for positioning the vehicle 100. This potentially poses a problem, since a single distance estimate is not sufficient for determining a location in two or three dimensions. However, as indicated above, multipath propagation between the radio transceiver 150 and one or more objects 215, 225 in the surrounding environment of the vehicle 100 can be exploited in order to improve positioning performance.

A multipath component (MPC) is a propagation component of a transmitted signal which has been reflected 210, 220 in some object 215, 225 prior to reaching the vehicle transceiver 110.

One method of exploiting MPCs for positioning was described in the article "Simultaneous Localization and Mapping in Multipath Environments: Mapping and Reusing of Virtual Transmitters" referred to above.

FIG. 2 also shows a remote server 230 from which the vehicle optionally can obtain additional data, and also upload data according to some aspects. The remote server 230 will be discussed in more detail below.

Figure 3:
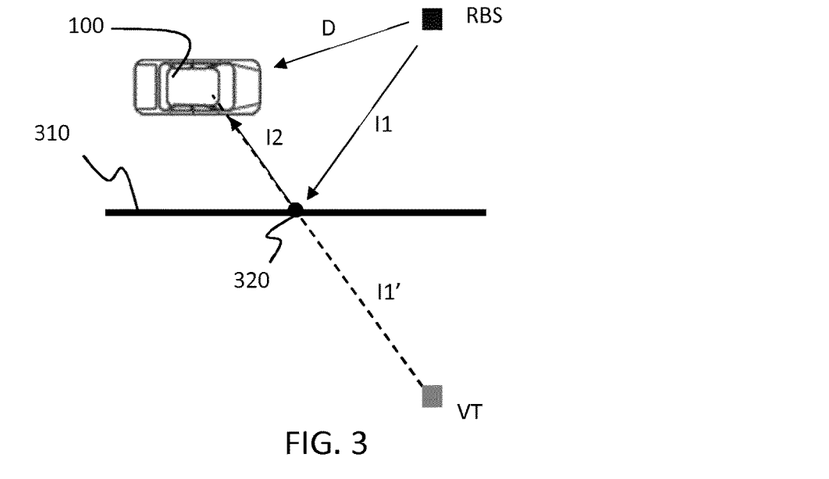

FIG. 3 illustrates an approach to using MPCs in order to determine a position of a vehicle 100. Here, an RBS transmits signals along a direct path D to the vehicle. The transmission also reaches the vehicle 100 via an indirect propagation path I1, I2 reflected 320 in a nearby object 310. Herein an throughout, both the direct propagation path and the indirect propagation paths are considered components in the multipath propagation scenario, both direct and indirect paths are therefore referred to as MPCs.

The indirect propagation path may be seen as originating from a virtual transceiver (VT), located at a position which corresponds to a reflection of the position of the RBS with respect to the reflecting object. This way, the single source of propagation delay measurements can be expanded into several sources of data, which may improve the positioning performance.

Figure 4:
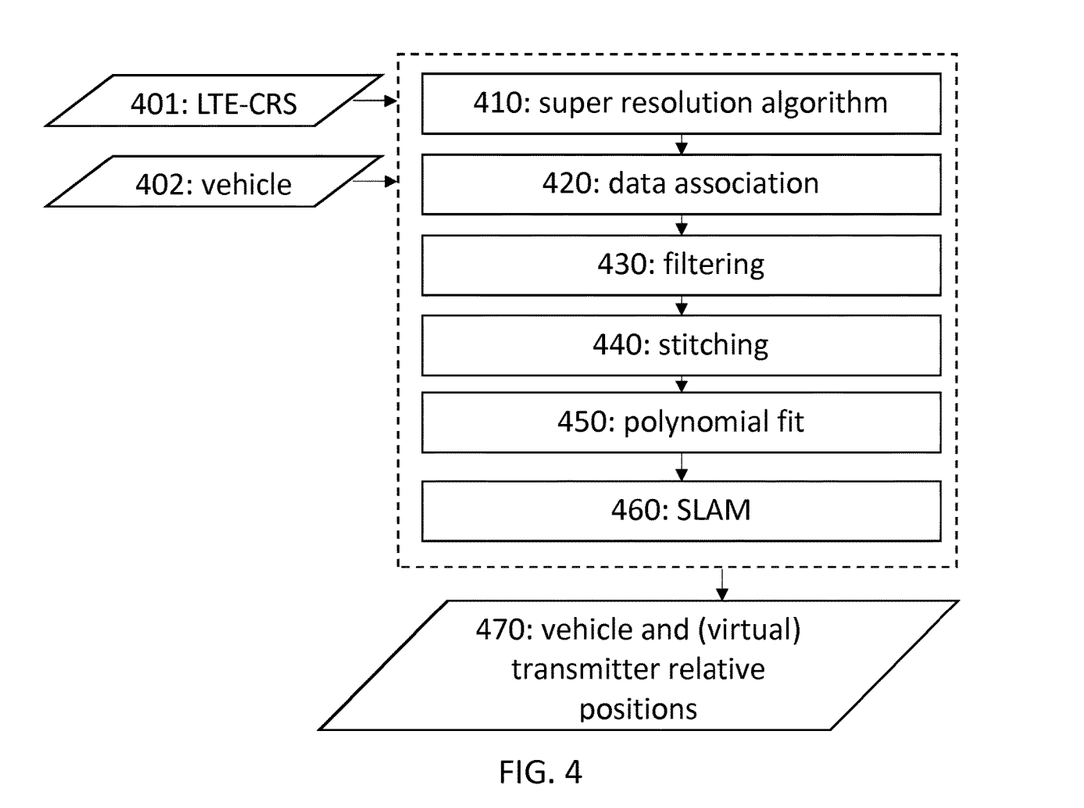
FIG. 4 is a flow chart illustrating methods.

FIG. 4 shows a flowchart presenting an example of the herein disclosed methods for positioning a vehicle based on MPCs. The method is based on obtaining propagation delay data 401, from, e.g., transmissions of LTE Common Reference Signals (CRS). The LTE-CRS signal is used to extract raw data for determining the MPCs. The advantage of using this signal is that it will be part of all implementations of LTE and the signal is spread out over the entire frequency spectrum which enables the extraction of MPCs. MPCs are, e.g., found by doing inverse Fast Fourier Transform (FFT) and identifying peaks as will be exemplified in FIG. 5 below.

Figure 5:
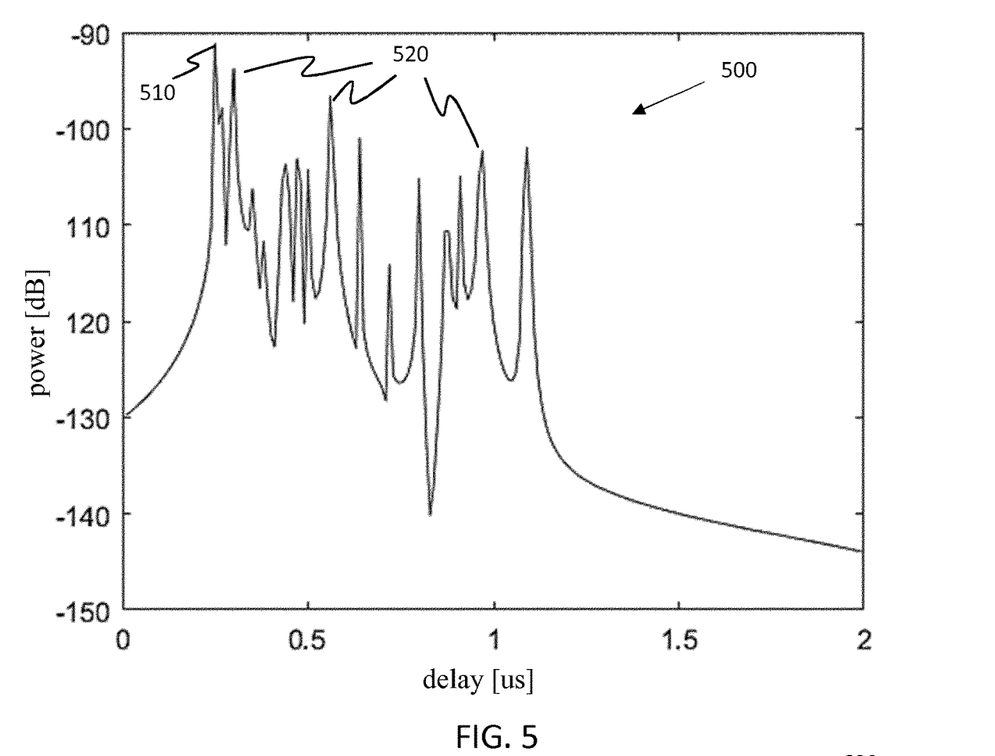
FIG. 5 is a graph illustrating a power delay profile.

With reference to FIG. 5, a graph 500 I shown illustrating a power delay profile where received power in dB is plotted versus delay in microseconds. The propagation scenario includes a plurality of multipath components 520 arriving at different delays and with different power. A first such MPC 510 is likely to be a line-of-sight propagation component followed to a plurality of reflected signal components.

This propagation delay data may be sufficient for establishing the position of the vehicle based on MPC. However, the proposed methods also includes obtaining vehicle data, e.g., vehicle heading and velocity. This data can be used in later stages of the proposed method in order to resolve ambiguities and to improve positioning performance. Inertia sensors in the car will help in the following processing steps. The acceleration data, in multiple dimensions, will provide a rough estimation of the relative vehicle path which may remove some ambiguous MPC data.

With reference again to FIG. 4, the LTE-CRS data is first input to a super-resolution algorithm 410 (SRA) such as MUltiple Signal Classification (MUSIC) or Estimation of Signal Parameters via Rotational Invariant Techniques (ES-PRIT), or other algorithm based on eigen value decomposition or the like. This stage resolves some of the MPCs which are located close to each other in delay. This part may optionally also include some filtering techniques in order to suppress measurement noise. The filtering may be based on the vehicle motion data.

According to an example, data association 420 can be performed by grouping multiple MPC detections within a defined distance and using a centroid value of the MPCs as a single MPC. A centroid value may be an average delay value of grouped MPCs, or it may be a weighted group average value of grouped MPCs. The weighting may be based on received signal power or on a measure of signal to noise ratio for the individual peaks in the power delay profile.

The example method 400 then includes filtering 430 selected MPCs by e.g. a Kalman filter or particle filter to create tracks of signal delays (MPC equivalents). These tracks are representations of the vehicle relative movement. The filtering may optionally be refined based on the vehicle motion data. For instance, a Kalman filter may be configured as a constant velocity model filter, a constant acceleration model filter, or a constant turn rate model filter depending on the current vehicle motion data.

Tracks may be broken due to temporary loss of reflected signals, i.e. virtual transmitters. To keep these together signals are selected based on time and vicinity and are then interpolated and stitched together in a stitching step 440. The stitching step can also be refined using the vehicle motion data, for instance, as an example, in case the vehicle is standing still while an MPC disappears and then re-appears at the same delay, then it can be estimated that the two MPCs correspond to the same virtual transmitter.

Finally, the created tracks are fit 450 to a model adapted to vehicle dynamics. According to an example, a 3rd order dynamic model is used to perform the fit. The polynomial model may optionally be based on the obtained vehicle motion data in order to refine the model.

The MPC trajectories are then used to calculate Time of Arrivals (TOA) from the different true and virtual transmitters and inputting this into a SLAM algorithm to generate a trajectory of the mobile station, i.e., the vehicle, as well as the positions of the real and virtual transmitters. SLAM algorithms for this purpose are known and will not be discussed in more detail here.

The end result of the example method 400 illustrated in FIG. 4 are the vehicle and transmitter relative positions, including both real and virtual transmitters.

Figure 6:
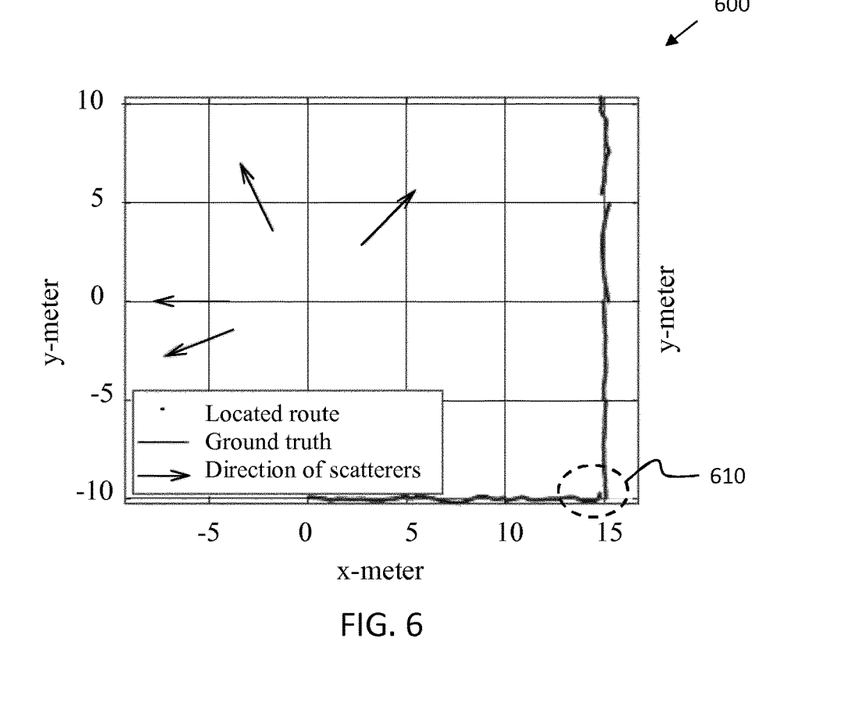
FIG. 6 is a graph illustrating a positioning result.

One such a result from a positioning scenario is illustrated in FIG. 6, which shows a graph 600 of x and y coordinates in meters of a vehicle moving along an L-shaped trajectory with a sharp turn 610 about half-way along the track. Suppose now that the turn is sharp left turn, but that there is an ambiguity in the data which also agrees with a sharp right turn. The obtained vehicle motion data can then be consulted to see which way the driver turns, and thus resolve the ambiguity.

Another example is a track which is associated with a number of hypotheses regarding location of virtual transmitters. One hypothesis includes virtual transmitters disappearing and new virtual transmitters appearing, while an alternative hypothesis includes the same virtual transmitters. Vehicle velocity can then be consulted to see if it is likely that the vehicle moves fast to enter a new environment, or if the vehicle is moving more slowly, in which case I is more likely that the same set of virtual transmitters are present for a longer duration of time.

Figure 7:
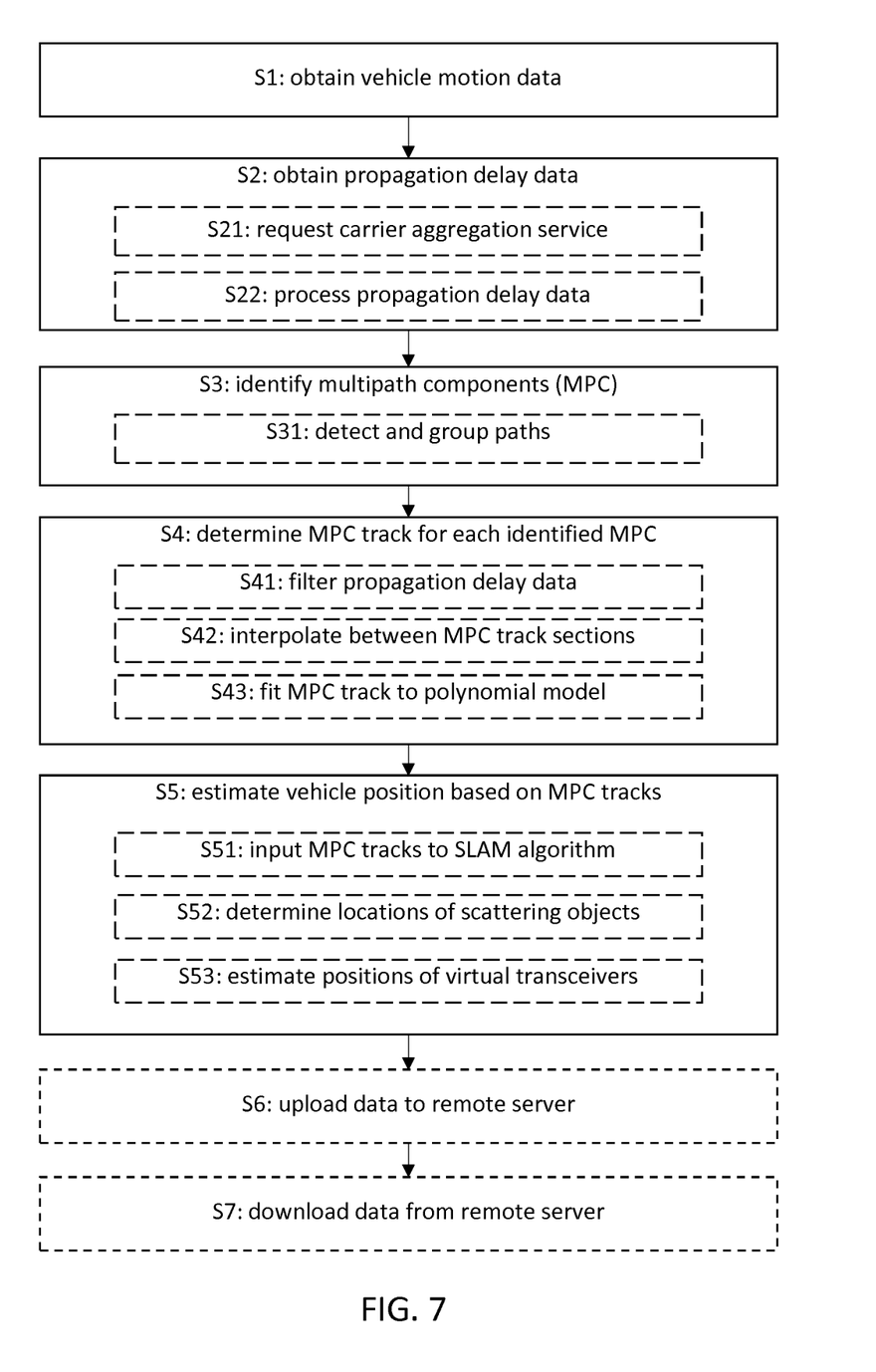
FIG. 7 is a flow chart illustrating methods.

FIG. 7 shows a flow chart illustrating aspects of the methods disclosed herein. There is shown a method for estimating a position of a vehicle 100 relative to one or more fixed or mobile radio transceivers 150, 160, 170.

The radio transceivers 150, 160, 170 may include an RBS 150, 160 in a wireless access network or a transceiver or transmitter arranged on a satellite 170 in fixed orbit. Thus, the method is applicable to, e.g., transmissions in systems such as LTE (3G/4G/5G), Wi-Fi, WiMAX, GPS, Glonass, and the like.

The method includes obtaining S1 vehicle motion data related to a trajectory T of the vehicle 100. The vehicle motion data may, e.g., include any of velocity data, acceleration data, vehicle heading data, and vehicle type data. This vehicle data can be used, e.g., to fit determined MPC tracks to models based on the vehicle data. The vehicle data can also be used to resolve ambiguities in the position estimation, by comparing vehicle motion data to a number of hypothesis regarding the position of the vehicle and virtual transmitters.

The method also includes obtaining S2 propagation delay data 500 associated with radio transmission between a vehicle transceiver 110 in the vehicle 100 and the one or more radio transceivers 150, 160, 170. The propagation delay data was exemplified above in connection to FIG. 5. In general, each MPC gives rise to a signal component arriving with a certain delay and with a certain power. The number of MPCs can be estimated and used to determine propagation delays. According to one example, the obtaining of propagation delay data includes applying an FFT.

The method further includes identifying S3 one or more multipath components 510, 520, MPC, in the propagation delay data 500, where each MPC relates to a radio transmission propagation path D, I between a fixed radio transceiver 150, 160, 170 and the vehicle transceiver 110, and where at least one MPC relates to an indirect radio transmission propagation path I between a fixed radio transceiver 150, 160, 170 and the vehicle transceiver 110. Consequently, both line-of-sight and non-line-of-sight transmission paths are herein labelled as MPCs.

According to aspects, the identifying includes detecting S31 propagation paths, grouping detected paths based on respective propagation path delay, and identifying each group of propagation paths as a single MPC having a respective MPC delay value. The grouping may also include weighting by variance of the individual MPCs, such that uncertain MPCs are given less weight than more certain MPCs. The weights may be based on signal component received power or on an estimate or measurement of signal to noise ratio associated with the signal components.

Based on the obtained and processed data, the method then proceeds to determine S4 an MPC track for each identified MPC 510, 520 based on the vehicle motion data and on the propagation delay data 500, where an MPC track represents an evolution of the respective MPC over time. It is noted that the determining is based both on the obtained propagation delay data and on the obtained vehicle data.

According to an example, a joint estimation problem for estimating positions of the vehicle jointly with positions of one or more virtual transceivers may be posed as a maximum likelihood estimation problem. The vehicle data then enters the problem and makes certain solution less likely. For instance, some solutions may require a vehicle to move in an uncharacteristic way, i.e., with too high acceleration or too abrupt turning rate.

The method generates results by estimating S5 the position of the vehicle 100 relative to the one or more radio transceivers 150, 160, 170 based on the MPC tracks.

The method may also include resolving ambiguities in the position estimation based on the obtained vehicle motion data. This resolving may, e.g., be based on a comparison between different positioning hypotheses and the obtained vehicle motion data. For instance, on hypotheses may include the vehicle turning in some way, which turning can then be compared to vehicle motion data related to steering wheel angle of the vehicle during the same time period.

According to aspects, obtaining propagation delay data includes processing S22 the propagation delay data to resolve individual propagation paths. This processing may, e.g., comprise applying eigenvalue decomposition techniques like the ESPRIT algorithm or MUSIC algorithm.

According to aspects, determining an MPC track includes filtering S41 propagation delay data based on vehicle motion data. This filtering may include any type of filtering methods, such as Kalman filters, Particle filters, multiple hypothesis testing (MHT), and the like. The filtering may optionally be configured based on the obtained vehicle motion data. For instance, a model for use with a Kalman filter may be selected based on the obtained vehicle motion data. Such models may, e.g., comprise constant velocity, constant acceleration, or constant turn rate models.

According to aspects, determining an MPC track includes interpolating S42 between MPC track sections when an MPC track is temporarily undeterminable in-between two MPC track sections.

The interpolating may also be based at least partly on the obtained vehicle motion data, as discussed above in connection to FIG. 4.

According to aspects, determining an MPC track includes fitting S43 the MPC track data to a polynomial model adapted to dynamics of the vehicle 100. The model may for instance be a third order polynomial model based on the obtained vehicle data.

According to aspects, the estimating includes inputting S51 the determined MPC tracks to a simultaneous location and mapping, SLAM, algorithm configured to estimate the position of the vehicle 100 relative to the one or more radio transceivers 150, 160, 170. One such example is the algorithms discussed in the article Simultaneous Localization and Mapping in Multipath Environments: Mapping and Reusing of Virtual Transmitters" referred to above.

According to aspects, the estimating step includes determining S52 locations of scattering objects 210, 220, 320 in a neighborhood of the vehicle 110.

According to aspects, the estimating step includes estimating S53 a position of a virtual transceiver VT for each MPC corresponding to an in-direct propagation path I.

According to aspects, the method includes uploading S6 obtained determined, or estimated data to a remote server 230.

According to aspects, the method includes downloading S7 any of propagation delay data, MPC data, an estimated position of a virtual transceiver and/or an estimated position of a fixed radio transceiver from a remote server 230.

Figure 11:
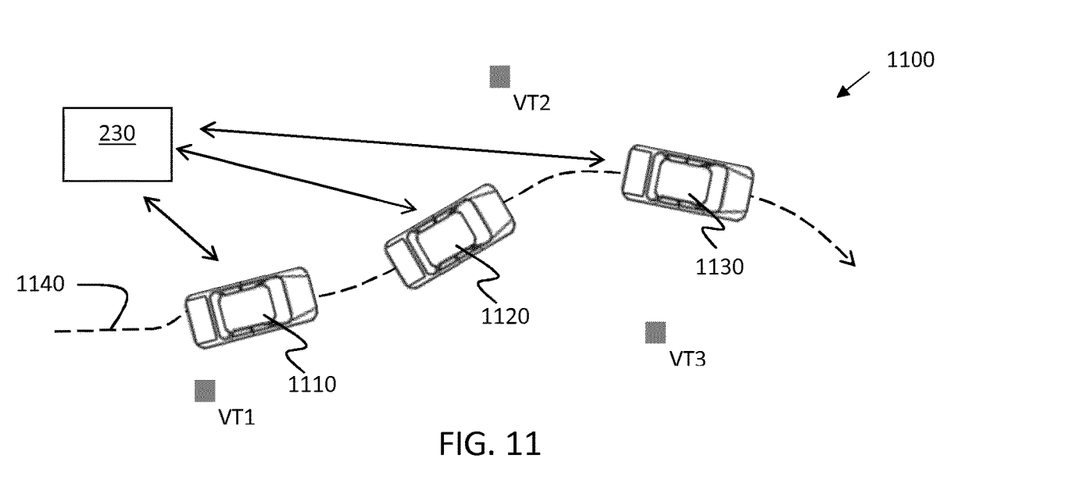
FIG. 11 shows an example platooning application.

The use of a remote server 230, such as the server 230 shown in FIG. 1 and FIG. 11, together with the discussed positioning methods enables several advantageous additions to the positioning methods discussed herein. For instance, a group of vehicles may collectively 'map' an area to determine locations of virtual transmitters as the vehicles traverse the area. Vehicles may then upload estimated positions of virtual transmitters, which uploaded virtual transmitter positions can be downloaded by other vehicles and used to enhance the position estimates. The downloaded data may, e.g., be used to initialize optimization algorithms and the like, e.g., maximum likelihood optimization routines.

The remote server 230 can also be used to enable collaborative positioning by a platoon of vehicles travelling through an area. An example of this type of application 1100 is illustrated in FIG. 11. Here a group of vehicles 1110, 1120, 1130 have formed a platoon travelling along a common track 1140, e.g., following a lead vehicle 1130. The vehicles estimate positions of virtual transmitters VT1, VT2, and VT3. The vehicles are connected to the remote server 230 and can therefore share information relating to the virtual transmitters.

It is appreciated the remote server 230 may also be a distributed server implemented collectively by one or more of the vehicles travelling in the platoon.

The use of the remote server with vehicle platoons, i.e., vehicles travelling in serial configuration, is especially advantageous since vehicles pass almost the exact same location in sequence. Thus, the first vehicle may estimate an initial set of virtual transmitter locations. The second vehicle in the platoon follows a similar track as the first vehicle and may therefore download and re-use virtual transmitter locations that have been estimated by the first vehicle. The third vehicle can download and use information from both the first and the second vehicle, and so on.

A subscription service may be offered to vehicle owners, which subscription service allows access to the remote server 230, which allows subscribing vehicles to benefit from the remote server data.

Vehicles may collectively verify data on the remote server 230. For instance, virtual transmitters are likely to come and go as the environment changes over time. The data can then be kept up to date using verification routines implemented in distributed fashion among the group of vehicles configured to access the remote server 230.

In summary, there is disclosed herein a remote server 230 configured to store estimated positions associated with virtual transmitters for positioning purposes. The remote server 230 is arranged to accept one or more connections from vehicles, and to store uploaded data obtained from the one or more vehicles. The remote server 230 is also arranged to provide data for downloading by the one or more vehicles, which data is associated with estimated locations of one or more virtual transmitters.

Figure 8:
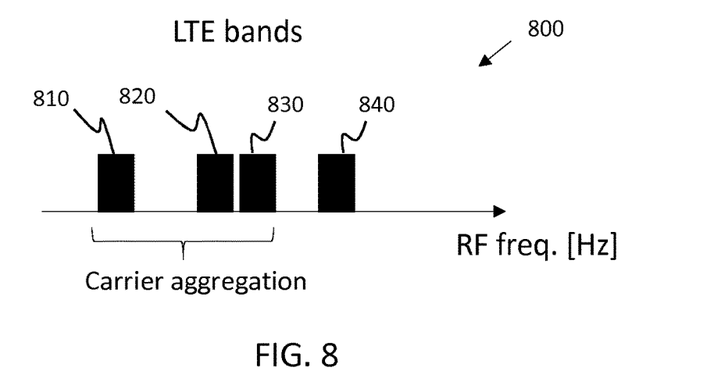
FIG. 8 is a graph illustrating communication frequency bands.

According to aspects, obtaining propagation data S2 includes requesting S21 a carrier aggregation service 800 from at least one of the one or more radio transceivers 150, 160, 170, and obtaining at least part of the propagation delay data based on radio transmission using aggregated wireless carriers 810, 820, 830.

FIG. 8 shows a collection of LTE frequency bands 800. In a normal mode of operation, a single frequency band is used. However, carriers 810, 820, 830 may be aggregated and used jointly for obtaining propagation delay data. This results in an increased bandwidth and consequently improves distance estimation accuracy.

Thus, there is disclosed herein a method for estimating a position of a vehicle 100 relative to one or more fixed or mobile radio transceivers 150, 160, 170. The method includes requesting a carrier aggregation service 800 from at least one of the one or more radio transceivers 150, 160, 170, and obtaining propagation delay data based on radio transmission using aggregated wireless carriers 810, 820, 830.

Figure 9:
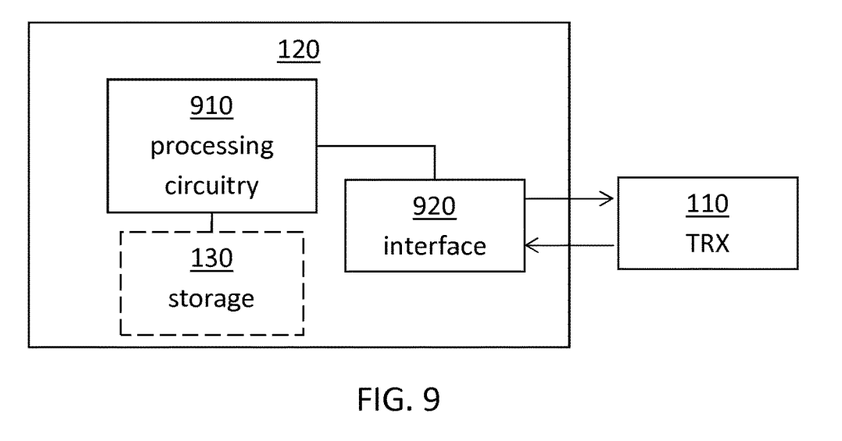
FIG. 9 schematically illustrates a control unit.

FIG. 9 schematically illustrates, in terms of a number of functional units, the components of an example control unit 120 according to an embodiment of the discussions herein. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 130. The processing circuitry 910 may further be provided as at least one application specific integrated circuit ASIC, or field programmable gate array FPGA. The processing circuitry thus includes a plurality of digital logic components.

Particularly, the processing circuitry 910 is configured to cause the control unit 120 to perform a set of operations, or steps. For example, the storage medium 130 may store the set of operations, and the processing circuitry 910 may be configured to retrieve the set of operations from the storage medium 130 to cause the control unit 120 to perform the set of operations. The set of operations may be provided as a set of executable instructions. Thus, the processing circuitry 910 is thereby arranged to execute methods as herein disclosed.

The storage medium 130 may also include persistent storage, which, for example, can be any single one or combination of magnetic memory, optical memory, solid state memory or even remotely mounted memory.

The control unit 120 further includes an interface 920 for communications with at least one external device, such as the vehicle transceiver 110. As such the interface 920 may comprise one or more transmitters and receivers, including analogue and digital components and a suitable number of ports for wireline communication.

The processing circuitry 910 controls the general operation of the transceiver, e.g. by sending data and control signals to the interface 920 and the storage medium 130, by receiving data and reports from the interface 920, and by retrieving data and instructions from the storage medium 130. Other components, as well as the related functionality, of the control node are omitted in order not to obscure the concepts presented herein.

Figure 10:
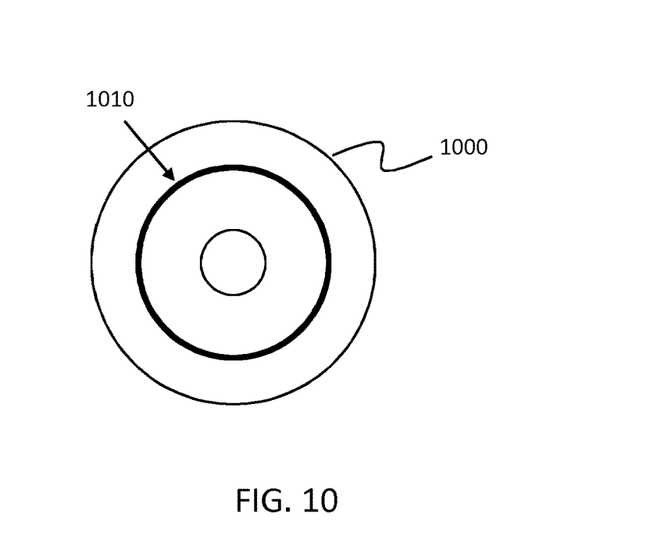
FIG. 10 shows an example computer program product.

FIG. 10 shows a computer program product 1000 including computer executable instructions 1010 to execute any of the methods disclosed herein.

Figure 12:
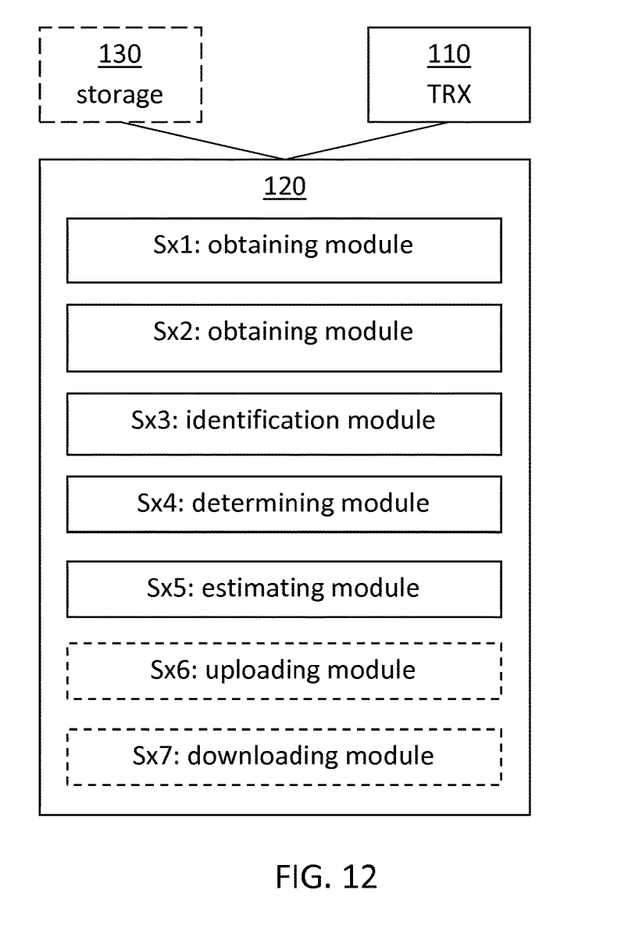
FIG. 12 schematically illustrates a control unit.

FIG. 12 schematically illustrates a control unit 120 for a vehicle 100, arranged to estimate a position of the vehicle 100 relative to one or more radio transceivers 150, 160, 170, including:

a first obtaining module Sx1 arranged to obtain vehicle motion data related to a trajectory of the vehicle 100, a second obtaining module Sx2 arranged to obtain propagation delay data 500 associated with radio transmission between a vehicle transceiver 110 included in the vehicle 100 and the one or more radio transceivers 150, 160, 170, an identification module Sx3 arranged to identify one or more multipath components 510, 520, MPC, in the propagation delay data, where each MPC relates to a radio transmission propagation path between a fixed radio transceiver 150, 160, 170 and the vehicle transceiver 110, and where at least one MPC relates to an indirect radio transmission propagation path between a fixed radio transceiver 150, 160, 170 and the vehicle transceiver 110, a determining module Sx4 arranged to determine an MPC track for each identified MPC based on the vehicle motion data and on the propagation delay data 500, where an MPC track represents evolution of an MPC over time; and an estimating module Sx5 arranged to estimate the position of the vehicle 100 relative to the one or more radio transceivers 150, 160, 170 based on the MPC tracks.

According to aspects of embodiments of the present invention, the control unit 120 further includes an uploading module Sx6 configured to upload obtained, determined, or estimated data to a remote server 230.

According to further aspects of embodiments of the present invention, the control unit 120 also includes a downloading module Sx7 configured to download any of; propagation delay data, MPC data, an estimated position of a virtual transceiver and/or an estimated position of a fixed radio transceiver from the remote server 230.

The control unit 120 is, according to some aspects of embodiments of the present invention, arranged to request a carrier aggregation service 800 from at least one of the one or more radio transceivers 150, 160, 170, and also to obtain at least part of the propagation delay data based on radio transmission using aggregated wireless carriers 810, 820, 830.

While the above description constitutes the preferred embodiment of the present invention, it will be appreciated that the invention is susceptible to modification, variation and change without departing from the proper scope and fair meaning of the accompanying claims.

The invention claimed is:

1. A method for estimating a position of a vehicle relative to one or more radio transceivers, the method comprising:

Obtaining vehicle motion data related to a trajectory of the vehicle;

obtaining propagation delay data associated with a radio transmission between a vehicle transceiver comprised in the vehicle and the one or more radio transceivers;

identifying one or more multipath components based on the propagation delay data, each of the one or more multipath components corresponding to a radio transmission propagation path between one of the one or more radio transceivers and the vehicle transceiver, wherein at least one of the one or more multipath components relates to an indirect radio transmission propagation path between the one of the one or more radio transceivers and the vehicle transceiver;

determining a multipath component track for each one of the identified one or more multipath components based on the vehicle motion data and on the propagation delay, data, the multipath component track representing an evolution of the corresponding one of the one or more multipath components over time; and estimating the position of the vehicle relative to the one or more radio transceivers based on the multipath component tracks, wherein the identifying the one or more multipath components comprises:

detecting propagation paths; and grouping the detected propagation paths into one or more groups of propagation paths based on respective propagation path delays, and wherein each one of the one or more multipath components is identified based on a respective one of the one or more groups of propagation paths.

2. The method according to claim 1, wherein at least one of the one or more radio transceivers is a radio base station in a wireless access network or is arranged on a satellite in a fixed orbit.

3. The method according to claim 1, wherein the vehicle motion data comprises any one of velocity data, acceleration data, vehicle heading data, and vehicle type data.

4. The method according to claim 1, wherein the detecting the propagation paths comprises processing the propagation delay data to resolve individual ones of the propagation paths.

5. The method according to claim 1, further comprising determining a respective multipath component delay value for each one of the one or more multipath components.

6. The method according to claim 1, wherein the determining the multipath component track further comprises filtering the propagation delay data based on the vehicle motion data.

7. The method according to claim 1, wherein the determining the multipath component track further comprises interpolating between two of multipath component track sections when the multipath component track is temporarily undeterminable in-between the two of the multipath component track sections.

8. The method according to claim 1, wherein the determining the multipath component track further comprises fitting data of the multipath component track to a polynomial model adapted to dynamics of the vehicle.

9. The method according to claim 1, wherein the estimating the position of the vehicle further comprises inputting the determined one or more multipath component tracks for the one or more multipath components to a simultaneous location and mapping algorithm configured to estimate the position of the vehicle relative to the one or more radio transceivers.

10. The method according to claim 1, wherein the estimating the position of the vehicle further comprises determining locations of scattering objects in a neighborhood of the vehicle.

11. The method according to claim 1, wherein the estimating the position of the vehicle further comprises estimating a position of a virtual transceiver for each of the one or more multipath components corresponding to an in-direct propagation path.

12. The method according to claim 1, further comprising of uploading obtained, determined, or estimated information to a remote server.

13. The method according to claim 1, further comprising downloading any one of the propagation delay data, multipath components data, an estimated position of a virtual transceiver, and an estimated position of one of the one or more radio transceivers from a remote server.

14. The method according to claim 1, wherein the obtaining the propagation delay data further comprises:
requesting a carrier aggregation service from at least one of the one or more radio transceivers, and obtaining at least part of the propagation delay data based on a radio transmission using aggregated wireless carriers.

15. A control apparatus for a vehicle, arranged to estimate a position of the vehicle relative to one or more radio transceivers, comprising;
processing circuitry configured to:
obtain vehicle motion data related to a trajectory of the vehicle;
obtain propagation delay data associated with a radio transmission between a vehicle transceiver comprised in the vehicle and the one or more radio transceivers;
identify one or more multipath components based on the propagation delay data, each of the one or more multipath components corresponding to a radio transmission propagation path between one of the one or more radio transceivers and the vehicle transceiver, wherein at least one of the one or more multipath components relates to an indirect radio transmission propagation path between the one of the one or more radio transceivers and the vehicle transceiver;
determine a in multipath component track for each one of the identified one or more multipath components based on the vehicle motion data and on the propagation delay data, the multipath component track representing evolution of the corresponding one of the one or more multipath components over time; and
estimate the position of the vehicle relative to the one or more radio transceivers based on the multipath component tracks,
wherein the processing circuitry configured to identify the one or more multipath components is further configured to:
detect propagation paths; and
group the detected propagation paths into one or more groups of propagation paths based on respective propagation path delays, and
wherein each one of the one or more multipath components is identified based on a respective one of the one or more groups of propagation paths.

* * * * *